Nov. 1, 1966   L. P. DICKINSON ET AL   3,282,133
BORING TOOL WITH FLEXIBLE ADJUSTMENT
Filed Sept. 16, 1964                    2 Sheets-Sheet 1

INVENTORS
LEONARD P. DICKINSON
CLEMENT J. RATKE
BY

ATTORNEYS

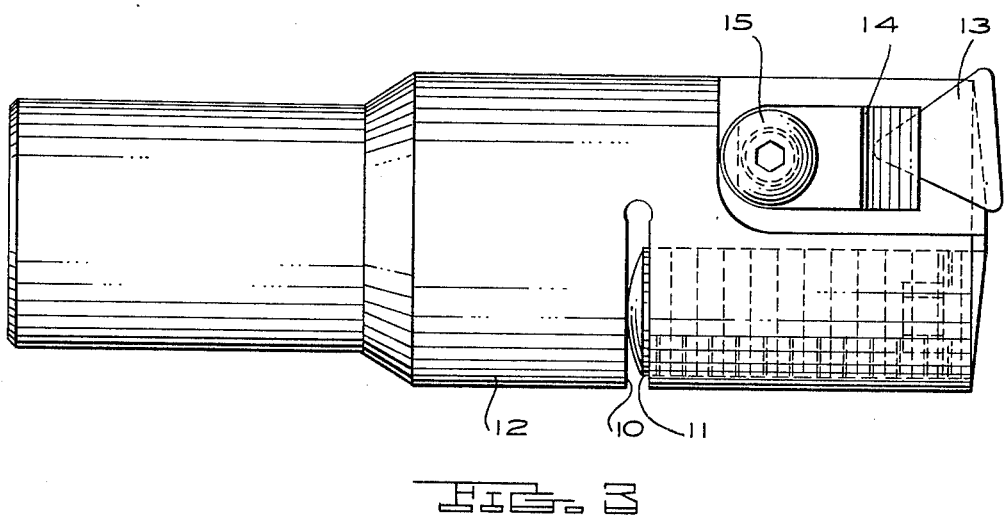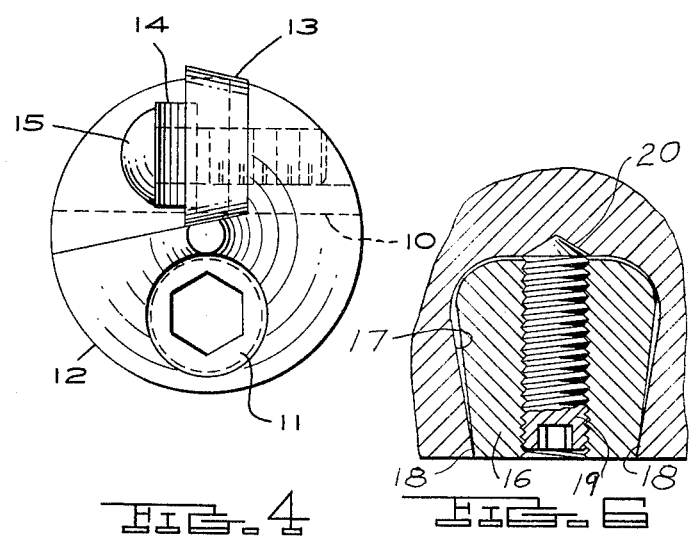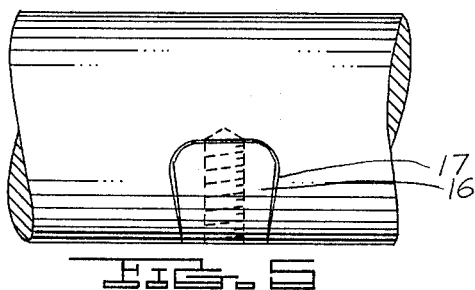
INVENTORS
LEONARD P. DICKINSON
CLEMENT J. RATKE
ATTORNEYS

United States Patent Office 3,282,133
Patented Nov. 1, 1966

3,282,133
BORING TOOL WITH FLEXIBLE ADJUSTMENT
Leonard P. Dickinson, Detroit, and Clement J. Ratke, Huntington Woods, Mich., assignors to The Valeron Corporation, Detroit, Mich., a corporation of Michigan
Filed Sept. 16, 1964, Ser. No. 396,875
2 Claims. (Cl. 77—58)

This invention relates to a single-point boring tool having a shank slit on one side with an adjustment screw adapted to vary the slit opening within a limited range accommodated by the flexibility of the shank body adjacent the slit.

The construction has been developed to provide a sufficient adjustment for cutting insert discrepancies and wear in essentially fixed diameter single point production boring tools and is particularly adapted for boring tools employing indexable throwaway cutting inserts for boring relatively small diameter holes.

In prior constructions the adjustment means per se have required an allocation of space substantially limiting the size of the indexable cutter element and clamping means, particularly where the boring tool is employed for relatively small holes. The present construction, and particularly one embodiment thereof, permits a maximum indexable insert and clamp size by incorporating an adjustment feature which in no way imposes space allocation in the area of the cutting element.

These and other objects will be more apparent from the following detailed description of a preferred embodiment and modification thereof as illustrated in the drawings wherein:

FIG. 3 is a side elevation of a boring tool employing a modified construction;

FIG. 4 is an end elevation thereof;

FIG. 5 is a fragmentary side elevation of a modified slot construction employing a wedge for actuation; and FIG. 6 is an enlarged fragmentary sectional view of the wedge employed in the modification of FIG. 5.

Figure 1:
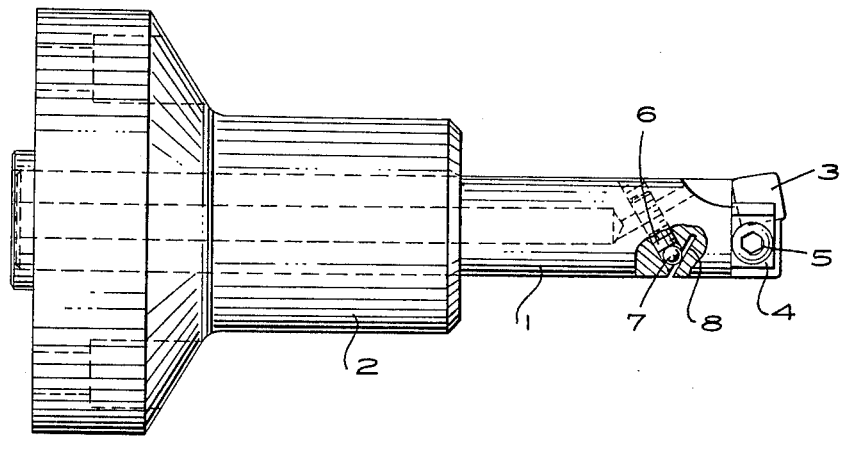
FIG. 1 is a side elevation of a single point boring tool employing the present construction.
Figure 2:
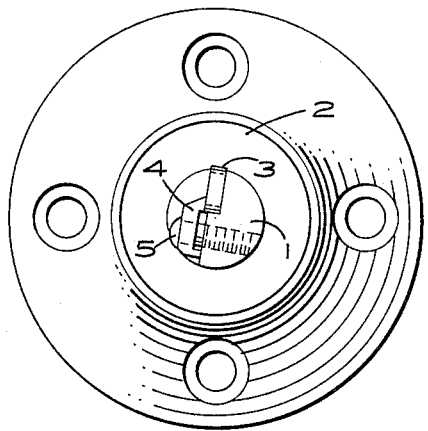
FIG. 2 is an end elevation thereof.

The boring tool comprises a boring bar 1 held in an adapter 2 for attachment to a conventional boring head. At the outer end of the boring bar an indexable insert 3 is held by a clamp 4 and clamp screw 5. A socket set screw 6 pressing against a hardened steel ball 7 provides adjustment pressure on the outer end of the boring bar within limits accommodated by the diagonal slit 8 and flexibility of the remaining stock in the boring bar beyond the slit. In practice a boring quill assembly employing this construction may be readily designed for holes having fractional inch diameters and the bar is preferably dimensioned to provide a cutting diameter slightly under nominal size so that some pre-tensioning of the adjustment screw 6 is required to provide the desired boring diameter. As a specific example, in the boring bar illustrated in FIGS. 1 and 2 designed for a ¾-inch hole, the slit as shown extending slightly less than one-half way through the boring bar provides an adjustment in the order of .010–.015 of an inch in the diameter, the indexable cutting element 3 and pocket therefor in the end of the boring bar being dimensioned for a diameter in the order of .003–.005 under nominal size so that a pre-loading of the adjustment screw 6 and ball 7 to this extent would be required for initial boring operation with the remainder of the adjustment allocated to compensate for insert discrepancies and wear.

It will be understood that the axial locations of the slit 8 will affect the range of adjustment possible within the elastic limits of the boring bar; thus if a greater range of adjustment were desired, the slit could be located further back on the boring bar providing a range proportional to the distance from the slit to the cutting element.

By dimensioning the boring bar for pre-loaded operating conditions of the adjustment means and by limiting the slit to approximately one-half of the boring bar diameter the adjustment feature results in a negligible loss of rigidity in the boring quill assembly and the ruggedness and simplicity of the design compatible with such adjustment feature have been found to provide unusually accurate, high quality finish and dependable results. It will, of course, be appreciated that since no clamping pressure or locking force is involved after making an adjustment, the cutting point may be adjusted with maximum precision relative to any gauge or master set-up.

With reference to the modified construction shown in FIGS. 3 and 4 a similar slit bar adjustment feature is adapted for face rather than lateral adjustment. In this case the slit 10 extends radially rather than diagonally and a socket-head set screw 11 extending axially on one side of the boring bar 12 bears directly against the front wall of the slit 10. A triangular indexable cutting element 13 is shown, held by a clamp 14 and clamp screw 15 located axially back of the cutter element 13 rather than transversely as in the first embodiment.

With reference to the further modified construction sown in FIGS. 5 and 6, a transverse wedge element 16 is seated within a transverse slot 17, the latter having a slightly greater taper angle providing for wedging contact near the outer perimeter 18 of the bar through all positions of wedging adjustment effected by adjustment screw 19 engaging a conical seat 20 at the center of the boring bar. An included wedging angle ranging in the order of 7° in large size boring bars up to 15° in smaller sizes has been found best for producing accuracy and ease of adjustment throughout the limited range required. It should be noted that this modification is suitable for a somewhat wider range of adjustment without over-stressing due to the wider form of slot providing greater area for flexing distribution.

While a particular preferred embodiment and two modifications thereof have been shown and described above in detail, it will be understood that numerous further modifications might be resorted to without departing from the scope of the invention as defined in the following claims.

We claim:
1. A single point boring tool comprising a boring bar, a transverse slot projecting part way through said boring bar axially spaced from the cutting point, said slot having tapered walls converging toward the outer perimeter, a wedge element within said slot adapted to react against said walls and means for adjusting said wedge element to produce an adjustment in effective cutting diameter of said boring tool, said adjustment means including an adjustment screw seated in said wedge adapted to react against said boring bar.
2. A boring tool as set forth in claim 1 wherein said wedging element is provided with clearance relative to said tapered walls adapted to provide wedging engagement near the perimeter of said boring bar.

References Cited by the Examiner
UNITED STATES PATENTS

| | | |
|---|---|---|
| 2,266,339 | 12/1941 | Shutz. |
| 2,553,699 | 5/1951 | Brodin. |
| 2,916,802 | 12/1959 | Blomstrand _____ 29—98 X |
| 3,089,358 | 5/1963 | Spurgeon _____ 75—58 |

WILLIAM W. DYER, Jr., *Primary Examiner.*

G. A. DOST, *Assistant Examiner.*